July 26, 1966     A. T. GODSCHALX     3,262,242

CONTROL CIRCUIT

Filed Aug. 6, 1963     5 Sheets-Sheet 1

Fig.1

INVENTOR
ADRIAN T. GODSCHALX

BY
Arthur H. Seidel
ATTORNEY

United States Patent Office 3,262,242
Patented July 26, 1966

3,262,242
CONTROL CIRCUIT
Adrian T. Godschalx, 223 N. Green Bay, Appleton, Wis.
Filed Aug. 6, 1963, Ser. No. 300,232
13 Claims. (Cl. 53—55)

This invention relates to a control circuit for governing the mechanical motions of an associated machine.

In one particular form of the circuit it functions to count a sequence of repeated, similar steps of an associated machine, then directs the machine to further operations after first testing the position and condition of various machine parts and work pieces, and while governing such further operations the circuit resets itself and readies the machine for another count of the repeated, similar steps.

An example of such an associated machine is one in which a number of individual packages are arranged in a row, then a second row is arranged and stacked above the first row, succeeding rows are further tiered above the original rows, and then after the several rows are assembled and counted a subsequent operation transports the entire group of packages into a waiting carton. The carton was first erected and opened as it was moved along an assembly line, and after receipt of the packages it is closed and sealed. The manipulation of the cartons, the stacking of packages and transporting of packages into cartons are all governed by the circuit of the invention.

There is provided, in the circuit, a number of counting relays that count the repeated steps of arranging rows of packages one atop the other, and which dictate to the machine timing of a vertical reciprocated motion which accomplishes the stacking of the packages. These relays are grouped in pairs, with the first relay of a pair noting the completion of a row and directing the machine to move the row into tiered position with other rows. The second relay of a pair notes the positioning of the row and directs the machine to prepare the next row. Each relay also establishes a circuit for energization of a succeeding relay, thus the first relay of a pair prepares a circuit for the next relay of the pair, and the second of a pair prepares a circuit for the first relay of the succeeding pair. In this fashion, a chain of relays counts the steps performed, and governs the machine through these steps. Then, after the sequence of repeated steps is completed the circuit governs succeeding machine operations and resets the chain of counting relays. As can be readily visualized the circuit can govern a multitude of different machine operations, and the steps to be counted need not necessarily be repeated, similar steps, but can take the form of a variety of machine operations that can be counted and then repeated in the succeeding cycle of machine operation.

The circuit of the invention further contemplates additional control relays for governing machine functions occurring subsequent to the action of the counting relays. In the particular instance of a packaging machine that has arranged packages in tiered rows, the subsequent operation comprises the movement of the packages into a carton, and the circuit for this operation includes test devices that determine the proper positioning and condition of a carton, the proper alignment of the tiered packages with the carton, and other criteria as may be deemed essential before insertion of the packages into the carton. The circuit also controls the program for moving the cartons through a series of stations in which cartons are erected, opened, glued and closed, and as a part of the controlled program testing for proper operation is carried out before each step is undertaken. Hence, the circuit can first count and govern a series of repeated steps (stacking in the vertical), then direct a motion in another direction of work (horizontal transport of packages into a carton), and then direct a motion in a third direction (cartons along an assembly line), all of such directions of motion requiring proper completion of prior motions so as to have an integrated operation.

It is an object of this invention to provide a control circuit that counts the steps taken in the operation of a machine and which signals succeeding operations in their proper sequence.

It is another object of this invention to provide a control circuit which may be adapted to supervise the operation of a variety of forms of machines.

It is another object of this invention to provide an automatic electrical control circuit for governing a machine that stacks packages in an orderly arrangement and disposes such packages in cartons.

It is a further object of this invention to provide a control circuit for governing the operation of a machine in which the successive steps of operation can only be carried out upon proper functioning of preceding steps.

It is a further object of this invention to provide a control circuit governing the operation of a machine which includes switch means for detecting the position of machine elements and to use such intelligence in operating control relays that initiate successive steps of operations.

The foregoing and other objects and advantages of this invention will appear from the description to follow. In the description reference is made to the accompanying drawings, which form a part hereof, and in which there is set forth specific embodiments for the circuit of the invention. Such embodiments are shown by way of illustration and not of limitation, and as to the scope of the invention reference is made to the appended claims.

For the purpose of illustrating the control circuit, it is shown in the drawings in combination with a carton packaging machine, and such carton packaging machine is, in turn, schematically represented, since the precise form of its elements are not a part of the invention. Rather, the machine is an adjunct which is to have its sequence of operation controlled and programed by the circuit forming the invention. The mechanical elements of the machine are further represented schematically for the purpose of simplifying a consideration of the machine, so that those aspects of the machine which are essential to an understanding of this particular application of the invention may be emphasized and more readily understood. Hence, the following explanation of the construction of the machine and its operation will dwell only on those portions related to an understanding of the control circuit itself.

The particular machine disclosed functions to place a number of packages, which are supplied to the machine in completed form, in cartons that are first erected by the machine and then sealed after receiving the packages. These packages are assembled in a number of rows tiered one on the other, and it is a purpose of the control circuit to count and determine the presence of the packages as they are being assembled, and to utilize the information of these counts to guide the operation of the machine through its sequence of operation. After the packages are assembled, they are transported into a waiting carton, which in turn has first been determined as being in position and empty by test elements of the circuit, and finally after filling the carton it and other cartons are moved through several stations of operation.

Figure 1:
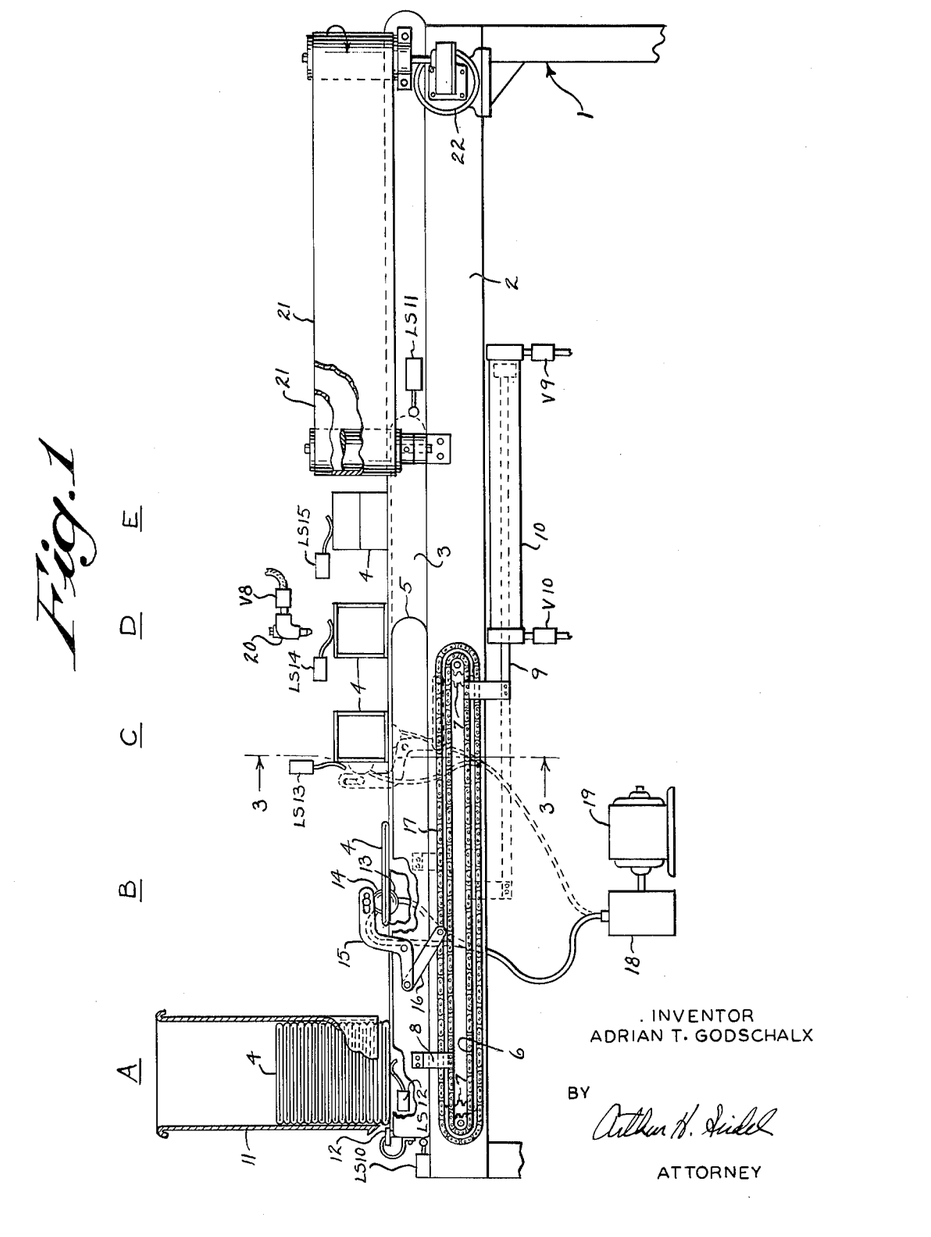
FIG. 1 is a front view of a schematic representation of a machine governed by the circuit of the invention, and in which there is shown a number of switch elements that are a part of the circuit.

Referring now more specifically to FIG. 1, the machine has a base frame 1 with an elongated, horizontal bed 2. Mounted on the top of the bed 2 is a pair of stationary rails 3 (see FIG. 3) upon which cartons 4 are transported down the bed 2 from the head end of the machine (the left hand end as viewed in FIG. 1) to the discharge end. Alongside the rails 3 is a reciprocably movable shuttle 5 that actuates dogs and other instrumentalities, most of which are not shown, for moving the cartons 4 along the rails 3 and then holding them in appropriate spaced work stations. Since most of the dogs and other attachments for moving the cartons 4 along the bed 2 are not interconnected with the electrical control circuit forming the present invention such items have been deleted from the drawings.

To reciprocate the shuttle 5 along the bed 2 a chain 6 is passed about a pair of sprocket wheels 7 at the side of the bed 2, and a connector 8 joins the chain 6 to the shuttle 5. The lower side of the chain 6 is connected to a piston rod 9 of an air cylinder 10, and as the piston within the cylinder 10 is reciprocated the chain 6 will have a like movement, which in turn is transmitted to the shuttle 5. To operate the cylinder 10 an electrical control valve V9 controls air input and exhaust at the right hand end of the cylinder, and a similar valve V10 is at the left hand end of the cylinder. Energization of valve V9 will cause a shuttle stroke, and energization of valve V10 will cause a shuttle retraction. The valves V9 and V10 are represented in the wiring diagrams by their operating coils, as are other control valves to be herein described.

Above the head end of the bed 2 is a magazine 11 that holds a supply of flat cartons 4. One carton, at a time, is removed from the bottom of the magazine 11 by a feeder finger 12 attached to the left hand end of the shuttle 5, so that upon each reciprocation of the shuttle 5 a flat carton 4 is moved from under the magazine 11. The position of magazine 11 is designated as station A in FIG. 1, and the finger 12 moves each carton 4 into the succeeding station B. The letters C, D, and E are also utilized in FIG. 1 to represent further successive stations which the cartons 4 will assume as they are transported a step at a time along the assembly line of the rails 3.

At station B suction devices attach to the bottom and top surfaces of a flat carton 4, the lower suction device 13 securing the base of the carton 4, and the upper device 14 securing itself to the left hand side of the carton 4. The upper suction device 14 is carried on a bell crank 15 pivotally mounted near its center on the shuttle 5. The lower end of the crank 15 is pivotally connected to one end of a link 16, that has its opposite end pivotally joined to a second chain 17 on the sprocket wheels 7. The chain 17 encircles larger diameter sprockets on the wheels 7, and consequently moves through a greater distance for each reciprocation of the piston rod 9. Thus, upon a left to right stroke of the shuttle 5 the bell crank 15 will be pivoted to raise up the suction device 14, thereby erecting the associated carton 4 into the position shown for station C. A vacuum pump 18 operated by a pump motor 19 is provided for vacuum devices 13, 14.

Station C is the carton loading station, which will be described more fully hereinafter in conjunction with the discussion of FIGS. 2 and 3. After the carton 4 is filled with packages at the station C it is moved, upon the subsequent reciprocation of the shuttle 5, to station D where flaps of the carton are automatically glued. A glue spray gun 20 is shown at station D together with an electrical operating valve V8. The gun 20 schematically represents the several glue guns that are properly orientated to direct glue upon carton flaps preliminary to closing of the flaps, and valve V8 forms a part of the electrical control circuit controlling the operation of such guns.

From the station D a carton 4 will next move to station E, upon the succeeding stroke of the shuttle 5, and its glued flaps will be closed as it moves into this station. From the station E the carton will be advanced, on the next stroke of the shuttle 5, between a pair of moving belts 21 that turn about vertical axis. These belts 21 apply pressure to the ends of the cartons 4, so as to retain the glued carton flaps under compression while the glue is setting, and they are driven by a pair of motors 22, one of which is shown in FIG. 1. The mechanical portions of the machine for opening the carton flaps, retaining them open, and then closing them after gluing are not shown in the drawings, since the electrical circuit of the invention is not intimately connected with these portions of the machine and they are not, therefore, necessary for an explanation and understanding of the invention.

Figure 2:
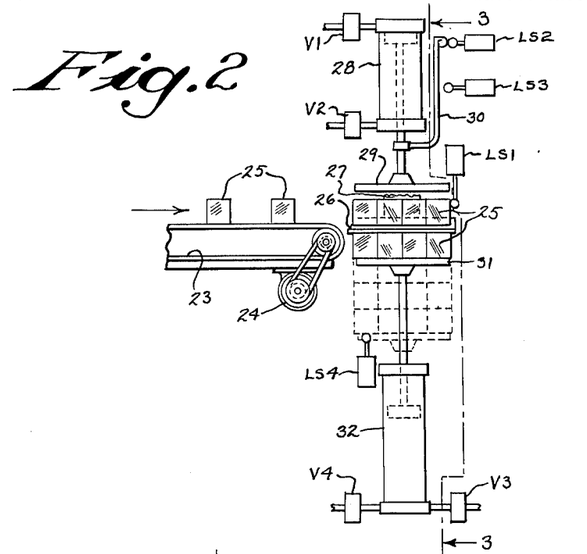
FIG. 2 is a rear view of portions of the machine and circuit elements associated therewith.

Turning now to FIG. 2, there is shown apparatus at the rear of station C for stacking the individual packages to be placed in the cartons 4. The schematic drawing of FIG. 2 is a rear view of this portion of the machine only, and it shows a portion of a conveyor belt 23, run by a motor 24, upon which individual packages 25 are delivered to the machine. These packages 25 are moved, by the action of the conveyor belt 23, onto a pair of spaced tracks 26. As more specifically seen in FIG. 3, the two tracks 26 are spaced apart to receive lower edges of the packages 25, and the tracks 26 are mounted on flexible arms 27 permitting them to be spread apart upon the application of a downward pressure to the top of the packages standing on the tracks.

When a row of four packages 25 is completed on the tracks 26, as shown in FIG. 2, a limit switch LS1 is operated to closed position, by the presence of the packages, to indicate to the electrical circuit of the invention that the packages 25 forming the row are now ready to be moved beneath the tracks 26.

To move a row of packages 25 beneath the tracks 26 there is provided an air cylinder 28 that reciprocates an upper platen 29 in a vertical motion. The cylinder 28 has an electrical control valve V1 that admits air, when energized, to descend the platen 29, and a second control valve V2 which admits, when energized, to raise the platen 29. To electrically indicate the position of the platen 29 there is provided a limit switch actuator 30 that closes a limit switch LS2 when the platen is raised, and which closes a limit switch LS3 when the platen is lowered.

Upon a depression of the platen 29 the row of packages 25 resting upon the tracks 26 are likewise depressed, and the tracks 26 separate by reason of the flexible arms 27. The row of packages 25 is then received by a lower platen 31 located beneath the tracks 26. As shown in FIGS. 2 and 3, one row of packages 25 is already deposited upon the lower platen 31, and the upper platen 29 is about to be depressed so that a second row of packages 25 will be moved downwardly to rest upon the first row. To support the rows of packages 25 beneath the tracks 26, the platen 31 is urged upwardly by the action of an air cylinder 32. The cylinder 32 has an electrically operated air inlet valve V3 and an electrical outlet valve V4. There is also associated with the platen 31 a limit switch LS4 that is closed when the platen 31 descends into its lowermost position. Hence, the limit switch LS4 will indicate when a predetermined number of rows of packages 25 are loaded upon the lower platen 31, which in the instance of the embodiment of the drawings is four rows.

Figure 3:
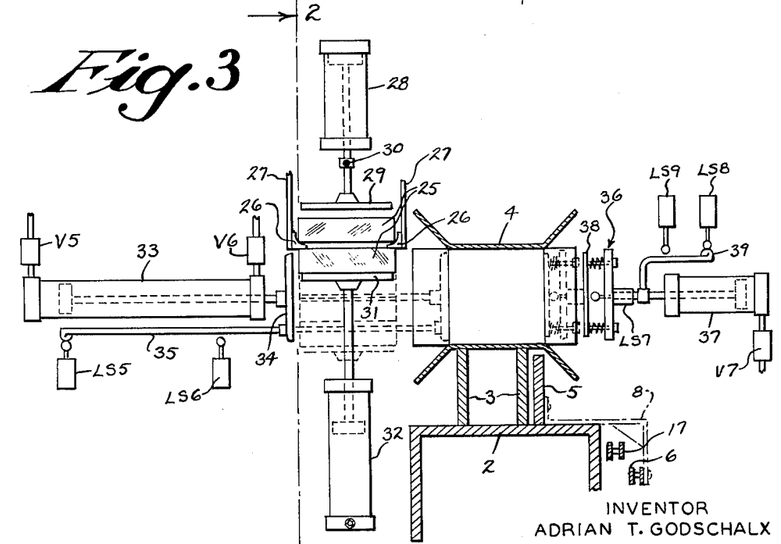
FIG. 3 is a view in section of the machine taken on the plane 3—3 shown in FIGS. 1 and 2.

Referring now more specifically to FIG. 3, there is shown in dotted lines the lowermost position for the platen 31, at which stage of operation the four rows of tiered packages 25 are to be moved into a carton 4. To move the packages 25 horizontally into a carton, there is provided an air cylinder 33 having electrically operated air inlet valve V5 and electrically operated air outlet valve V6. A horizontally movable feed plate 34 is operated by the cylinder 33, after the platen 31 has moved to close the limit switch LS4, in a thrusting motion to the right, as viewed in FIG. 3, to transport the packages 25 from the platen 31 into the waiting carton 4. The movements of the feed plate 34 are detected by a limit switch LS5, which is operated by a switch actuator 35 when the plate 34 is moved into and out of its retracted, or left hand position, and a second limit switch LS6 which is closed by the actuator 35 when the plate 34 is moved into its actuated, or right hand position, as shown in dotted lines in FIG. 3.

The limit switch LS5 has a first closed position, when the plate 34 is retracted, and a second contact closed position when the plate 34 is moved out of retracted position, as will be explained more fully hereinafter in reference to FIG. 5.

To the front of the carton 4 in station C, or the right hand side as viewed in FIG. 3, is a detecting plate 36 that is moved into the open front of each carton 4 by an air cylinder 37. The purpose of the detecting plate 36 is to determine, preliminary to a carton filling motion of the feed plate 34, whether the carton 4 at station C is upright, open and empty, so as to be in condition to receive a group of packages 25. A second function of the plate 36 is to detect the presence of the packages 25 in the carton 4 after a filling motion has been completed by the feed plate 34. To perform its detecting functions, the plate 36 is provided with a spring mounted touch plate 38 which will be deflected rearward upon contacting part of a carton 4, or any object within a carton. Directly behind the touch plate 38 is a normally open switch LS7 that is closed upon deflection of the plate 38.

The cylinder 37 has an electrically operated air inlet and exhaust valve V7, and the cylinder 37 is also of the spring return type, so that only one control valve is necessary. The position of the plate 36 is detected by a pair of limit switches LS8 and LS9. Switch LS8 is closed by a limit switch operator 39 when the plate 36 is retracted, and the switch LS9 has its normally open contacts operated to the closed position when the operator 39 is moved forwardly.

A number of additional limit switches are used in conjunction with the mechanical apparatus of FIG. 1, to detect the position of the shuttle 5 and the proper presence of cartons 4 in the various stations through which they are moved. These additional limit switches comprise: limit switch LS10 closed when the shuttle 5 is in retracted position, normally open limit switch LS11 that is closed by the shuttle 5 completing its full stroke, limit switch LS12 which detects the presence of cartons 4 in the magazine 11 and is held closed by the presence of cartons, limit switch LS13 at station C which is closed when a carton is properly erected in this station, limit switch LS14 which is closed by a carton moving into station D to serve as an indication for operating the valve V8 for the glue spray guns 20, and limit switch LS15 which is closed by a carton moving into station E.

Figure 4:
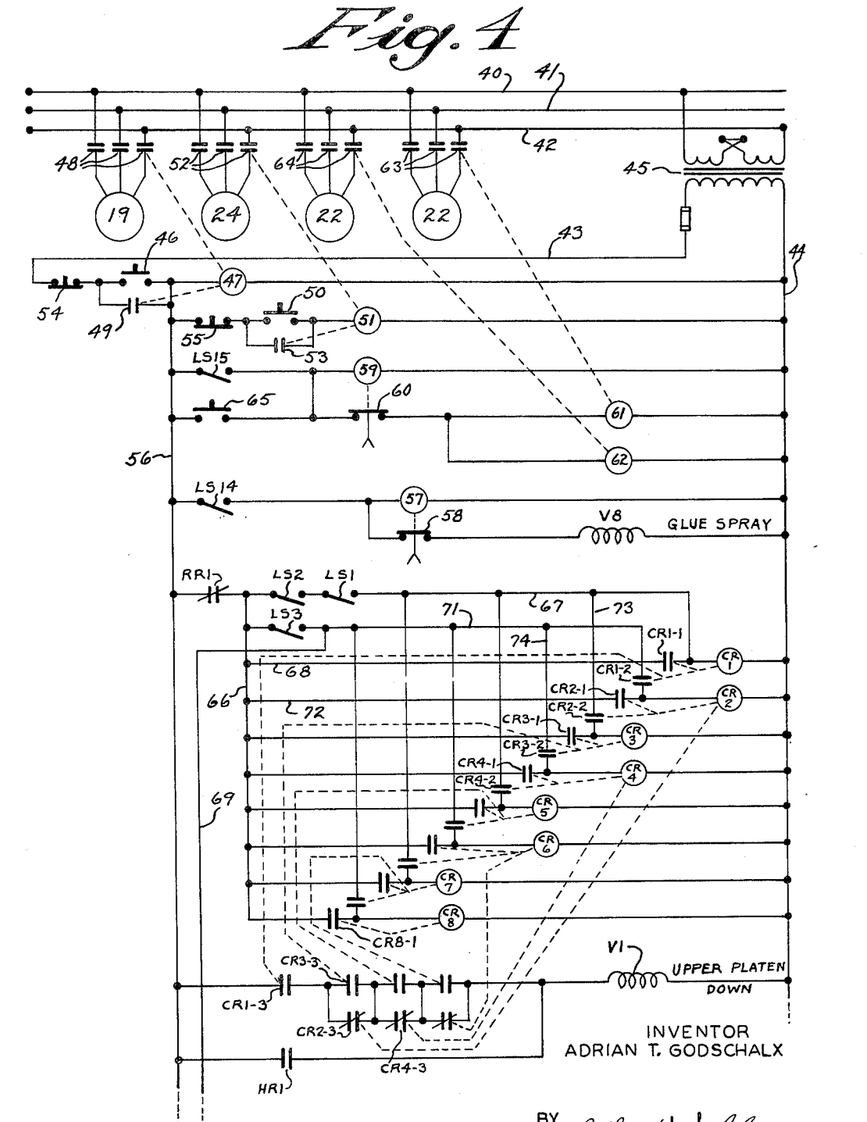
FIG. 4 is part of a wiring diagram of the circuit for governing the machine.
Figure 5:
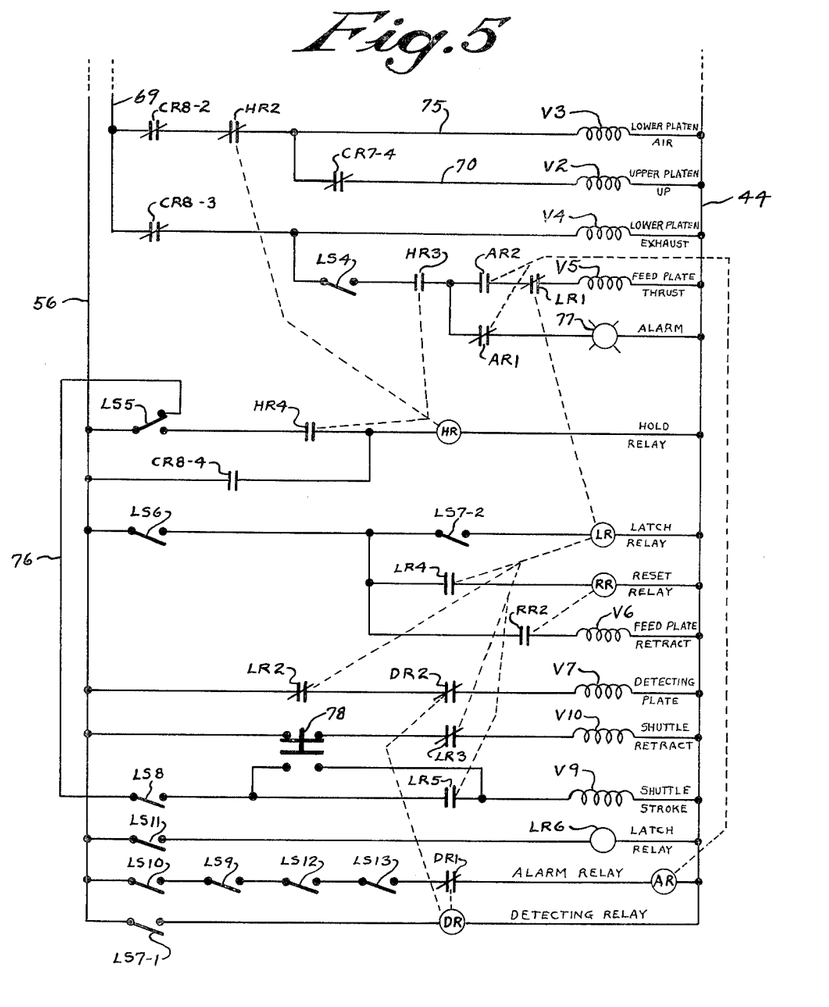
FIG. 5 is a continuation of the diagram of FIG. 4.

Reference is now made to the schematic wiring diagrams of FIGS. 4 and 5, which depict the particular circuit embodiment of the invention used for programming the operation of the packaging machine. FIG. 5 is a continuation of FIG. 4, and the circuit will be divided into groupings to enable a clearer analysis. Referring first to the upper portion of FIG. 4 above the phantom line, the four motors 19, 22 and 24 are connected across three power lines 40, 41, 42 and control voltage leads 43,44 are supplied through a transformer 45. Upon depressing a start button 46 motor starting switch 47 is energized to close its line contacts 48 and start vacuum pump motor 19. Self-holding contacts 49 of the starting switch 47 also close to provide a shunt circuit above the start button 46, so that upon release of the button 46 the switch 47 will remain energized. Upon depressing a second start button 50 a second motor starting switch 51 is energized to close its line contacts 52 to start the loading conveyor motor 24. Also, normally open self-holding contacts 53 of the switch 51 close to shunt the second start button 50, whereby the switch 51 will remain energized upon release of the second start button 50. Stop buttons 54 and 55 will function to stop the motors 19 and 24 in usual fashion, and also a control voltage supply lead 56 will be disconnected upon opening the stop button 54.

Wherever limit switch LS14 is closed, by virtue of a carton 4 moving into station D, time delay relay 57 is energized, and after a short interval will open its normally closed contacts 58. During the interval when limit switch LS14 and the contacts 58 of relay 57 are both closed valve V8 is energized to operate the glue spray guns 20. Upon the opening of the relay contacts 58 the gluing operation is completed, and the contacts 58 of relay 57 remain open until limit switch LS14 is reopened to allow relay 57 to assume its deenergized, normally closed position. Then, upon the next carton 4 entering station D of FIG. 1 it will initiate another gluing operation preparatory to having its flaps closed by flap guides, not shown.

Whenever limit switch LS15 closes, by virtue of a carton 4 moving into station E, the coil of normally closed time delay relay 59 will be energized. The contacts 60 of relay 59 will remain closed for a short period after closure of limit switch LS15, to energize motor starting switches 61 and 62 which close their line contacts 63, 64, respectively, to start and run compression belt motors 22. The motors 22 then turn the compression belts 21 until the contacts 60 of time delay relay 59 open the circuits of the coils of starting switches 61, 62. Thus, when a carton 4 is moved by the shuttle 5 from station E to between the compression belts 21 the succeeding carton 4 moving into station E operates the belt motors 22 to carry the first carton through the belts and out the delivery end of the machine. A manual advance button 65 is also provided in parallel with the limit switch LS15, so that the motors 22 can be operated manually independent of the remainder of the apparatus.

The counting circuit for governing the stacking of packages 25 and retaining information on the count of such packages is shown below the phantom line of FIG. 4. In this circuit a set of normally closed contacts RR1 of a reset relay RR (the contacts RR1 are shown in the upper left hand corner of the counting circuit, and the remainder of the relay is in FIG. 5 and will be described hereinafter) functions to connect lead 56 to a supplementary operating voltage lead 66. The lead 66 forms one voltage lead for the counting circuit relays to be described, and together with the lead 44 an operating voltage is supplied to the counting circuit. Hence, when the reset relay contacts RR1 are opened the counting circuit is deenergized to return the circuit to a starting condition.

The first information which is read into the counting circuit is a closure of limit switch LS2, which indicates that the platen 29 is up, and the second information read into the circuit is a closure of limit switch LS1 that indicates that a row of packages 25 has been compleed upon the flexible tracks 26. Upon closure of these two limit switches the coil of a first counting relay CR1 is energized through the lead 56, the contacts RR1 of reset relay RR, the limit switches LE1, LS2, a lead 67, and the lead 44. Counting relay CR1 has a set of normally open self-holding contacts CR1-1 to keep the relay energized through lead 66, a lead 68 and lead 44. Control relay CR1 has a second set of normally open contacts CR1-2 which close to partially complete an energizing circuit for a second counting relay CR2, and relay CR1 also has a third set of normally open contacts CR1-3 that close to energize the down valve V1 for the cylinder 28. The circuit for the control winding V1 extends from the voltage lead 66 to contacts CR1-3, then a series of normally closed contacts of counting relays to be described, and is completed by the lead 44.

Upon the energization of valve winding V1 the upper platen 29 is moved downwardly to deposit the row of packages 25 on the lower platen 31, the lower platen being supported by the air cylinder 32. When the downward movement of platen 29 is completed the limit switch LS3 is closed. This switch LS3 is shown grouped with switches LS1 and LS2 in FIG. 4, and upon closure of limit switch LS3 three functions occur. First, valve V2 of the cylinder 28 is energized (valve V2 is shown in FIG. 5) through a lead 69, several closed contacts to be later identified, a lead 70, and the lead 44, so that the platen 29 will be automatically raised above the tracks 27 to enable another set of packages 25 to be placed on the tracks by the conveyor 23. Secondly, the valve V3 of cylinder 32 is operated through lead 69 and a lead 75 to its open position; air supplied through valve V3 at a regulated pressure is thus admitted to cylinder 32 to ensure that the air pressure in the cylinder is satisfactory. (As will be hereinafter noted air pressure is established in cylinder 32 before any packages 25 are deposited on the lower platen 31.) Thirdly, and of prime importance in the operation of the counting circuit, closure of limit switch LS3 also performs the function of energizing counting relay CR2 through a lead 71 and the contacts CR1–1, which had previously been closed to ready the energizing circuit for relay CR2. Counting relay CR2 has a first set of normally open contacts CR2–1 which function as self-holding contacts to retain relay CR2 energized through a lead 72, a second set of normally open contacts CR2–2 which close to ready an energizing circuit for a third counting relay CR3, and in addition a set of normally closed contacts CR2–3 in the circuit of valve V1 that open to deenergize the valve and allow the platen 29 to rise in response to the energizing of valve V2 by the closure of limit switch LS3. When the platen 29 rises to its upper position the limit switch LS2 will be closed to inform the circuit.

Thus, the first reciprocation of the platen 29 has been initiated and controlled by the counting circuit, and the information of one cycle of the platen 29 is stored in the circuit by continued energization of the counting relays CR1 and CR2, which are held energized by their respective closed self-holding contacts. The counting circuit is now ready to govern a second reciprocation of the platen 29 upon the filling of the tracks 26 with a second row of packages 25. This is the point in the operation of the machine that is depicted in FIGS. 2 and 3, where the four packages 25 of a second row have been delivered onto the tracks 26 to close the limit switch LS1. Upon closure of switch LS1 the counting circuit will count the event and reciprocate the platen 29, as before, but utilizing the next two counting relays CR3 and CR4.

Hence, upon the second closure of switch LS1 counting relay CR3 is energized through the contacts CR2–2 and a lead 73 branching off the lead 67. Relay CR3 has its own self-holding contacts CR3–1 which become closed, it also closes a set of normally open contacts CR3–2 to set up a circuit for energizing the relay CR4, and lastly it has a set of normally open contacts CR3–3 which close to again energize the valve V1. The platen 29 now pushes the second row of packages 25 beneath the tracks 26, and this second row is tiered upon the first row to be supported by the lower platen 31.

When the upper platen 29 reaches its downward limit of travel the limit switch LS3 is again closed. This closure energizes the counting relay CR4 through contacts CR3–2 and a lead 74 branching downward from the lead 71. Counting relay CR4 has a first set of normally open, self-holding contacts CR4–1 which close to hold the relay energized, a second set of normally open contacts CR4–2 which close to set up a circuit for the next counting relay CR5, and also a set of normally closed contacts CR4–3 in the circuit of valve V1 that opens to deenergize the valve V1, whereby the platen 29 is now free to be raised. The closure of limit switch LS3 also again functions to energize valve V2 in the same fashion as it did in connection with the foregoing description of its first closure. The platen 29 will consequently return to its upper position and reclose limit switch LS2. The counting circuit is now ready to commence a third controlled reciprocation of the platen 29 and to store the information as to the number of reciprocations made.

In like fashion, a counting relay CR5 will be energized upon a third closure of limit switch LS1, to again initiate downward movement of the platen 29, a counting relay CR6 will return the platen 29, a counting relay CR7 will again send the platen 29 down, and a final counting relay CR8 will be energized on the last downward stroke of the platen 29. The relay CR8 has contacts differing from the previous relays: the first set is a normally open self-holding contact CR8–1 that is similar to the holding contacts of the previous counting relays; it has no normally closed contacts in the circuit of valve V1, like the other even numbered counting relays, since it is desired to hold the platen 29 down during the operation of the machine following the counting and stacking of packages; but it does have a number of contacts in FIG. 5 comprising a set of normally closed contacts CR8–2 in the circuit for valves V2 and V3, a set of normally open contacts CR8–3 in the circuit of valves V4 and V5; and a last set of normally open contacts CR8–4 in the circuit of a hold relay HR.

In summary, the counting circuit of the lower part of FIG. 4 is characterized by two chains of counting relays, the first chain being operated through the limit switches LS1, LS2 (which function as indicating switch means that signal completion of a machine operation to the circuit) to move the platen 29 in one direction. This first chain constitutes the odd numbered relays. The second chain, constituting the even numbered relays, operates through limit switch LS3 (which functions as a second indicating switch means that signals completion of another machine operation) and is coordinated with the up-stroke of the platen 29 to count and form a memory of the completed strokes. The relays also operate in pairs, for example relays CR1 and CR2 form a first pair and relays CR3 and CR4 form a second pair, and the first relay of a pair initiates a down-stroke of the platen 29 and the second relay operates with the return-stroke. Of these pairs of relays, the first relay of each pair is in the first chain of relays, and the second relay of each pair is in the second chain. Another characteristic of the counting relays is that each remains in contact actuated position to retain a memory of the stroke completed, and in becoming actuated it sets up a circuit for the next relay, such succeeding relay being in the opposite chain.

The counting relay contacts CR1–3, CR2–3, etc. for energizing and deenergizing the down-stroke valve V1 are connected with the normally open contacts of the first chain of relays in series and with the normally closed contacts of the second chain of relays paralleling the normally open contacts, this paralleling being characterized in the closed contacts of a particular relay, such as CR2–3, being across the normally open contacts of the first relay of the next pair, contacts CR2–4. This arrangement operates the single device valve V1. If a number of devices are to be operated the relay contacts will be connected accordingly in a fashion to satisfy the particular requirement. Similarly, the indicating switch means that supply input information into the counting circuit, limit switches LS1, LS2 and LS3, can be split into a number of individual switches if desired.

Upon completion of the counting and control of the vertical reciprocations of the platen 29 the packaging machine is now ready to transport the tiered packages 25 into a carton 4, and the control circuit will now govern and control the succeeding horizontal operation of feeding packages into a carton.

When the last counting relay CR8 is operated it is desired to keep the platen 29 down, and thus to retain valve V1 energized. For this reason relay CR8 does not have a set of opening contacts in the circuit of valve V1. Also, since valve V1 is to be retained energized, after the counting and stacking of packages, it is necessary that the circuit to valve V2 be opened before the platen 29 reaches its final downstroke and operates limit switch LS3. To have this timely opening of the circuit of valve V2 a set of normally closed contacts CR7–4 are provided (see FIG. 5) which open upon operation of counting relay CR7.

When the counting relay CR8 is energized its normally closed contacts CR8–2 open to ensure that valve V3 is retained deenergized, and its normally open contacts CR8–3 close to energize valve V4. Valve V3 thus cuts-off the supply of air to the cylinder 32, and valve V4 bleeds the cylinder 32 to allow the lower platen 31, with its load of packages 25, to fall to its lowermost position. In this position limit switch LS4 is closed as a preliminary signal that the packages 25 are at proper level for horizontal transport into a carton 4.

The last set of contacts CR8–4 of the counting relay CR8 close to energize a holding relay HR, and relay HR performs the following switching functions:

(1) A set of normally open contacts HR1 (shown at the bottom of the counting circuit in FIG. 4) close to provide a supplementary energizing circuit for valve V1, that will keep the valve V1 energized after the counting relays CR1 through CR8 are reset and deenergized, (2) Normally closed contacts HR2 open in the circuits of valves V2 and V3 to insure retention of the platens 29, 31 in their lower positions after the counting relays are reset and deenergized, (3) Normally open contacts HR3 close to ready a circuit for operating valve V5, which valve will cause a horizontal thrust of the feed plate 34 toward the waiting carton 4 in station C, and (4) Self-holding contacts HR4 close to hold relay HR energized after the counting relays are reset. However, these self-holding contacts HR4 function only so long as limit switch LS5 is operated into its lower closed position, which occurs during the thrusting and retracting motion of the feed plate 34. Normally, when the feed plate 34 is in retracted position limit switch LS5 is in its upper closed position, as shown in FIG. 5, which connects a lead 76 to the voltage supply lead 56 for preparing a circuit that moves the shuttle 5 in its stroke, as will be explained in more detail.

In summation, the relay HR serves to hold the platens 29, 31 down for a time duration beyond resetting of the counting relays (resetting will be described), to signal a readiness to thrust packages into a carton, and to hold itself energized until the feed plate 34 returns to its retracted position.

Before a thrust of packages 25 can be made into a carton 4, the carton must first be tested for proper erection and an empty interior. For this purpose, the detecting plate 36 is moved into a carton at station C by energizing valve V7. If an obstruction is detected limit switch LS7 closes its contacts LS7–1 to energize detecting relay DR, which relay has a first set of normally closed contacts DR1 that open a circuit for an alarm relay AR, and a second set of normally closed contacts DR2 in the circuit for valve V7 which deenergizes the valve V7 to quickly retract the detecting plate 36 from the object which it has contacted. The first set of contacts DR1 prohibits an alarm relay AR from operating, and this in turn will cause an alarm 72 to be energized through normally closed alarm relay contacts AR1, contacts HR3 which were closed upon energizing holding relay HR, limit switch LS4 which has been closed by the platen 31 moving into its bottom position, and contacts CR8–3. A second set of alarm relay contacts AR2 will remain open to preclude energization of valve V5, which would otherwise cause a thrust of feed plate 34. Hence, non-operation of the relay AR prohibits lateral transport of packages 25, even though limit switch LS4 and hold relay HR have operated satisfactorily.

If there is no malfunction, the alarm relay AR will be energized through a circuit comprising limit switch LS10 which must be closed to signify that shuttle 5 is retracted, limit switch LS9 which must close to indicate that detection plate 36 is properly within a carton 4 to be ready to detect packages 25 that are to be inserted, limit switch LS12 which must close to indicate there is a supply of cartons in the magazine 11, and limit switch LS13 which must close to indicate a carton 4 being in station C.

Now, with the circuit having sensed proper operation of the machine, the thrust of the packages 25 into the carton 4 is accomplished by energizing valve V5 to admit air into the cylinder 33. When the feed plate 34 reaches its maximum travel the limit switch LS6 is closed by the operator 35, and the limit switch LS7 is operated by being struck by packages 25 entering the carton 4 at station C. The limit switch LS7 closes its second set of contacts LS7–2, and the closure of these contacts and limit switch LS6 establish an energizing circuit for a latch relay coil LR of a latch relay. The latch relay performs the following switching:

(1) Its normally closed contacts LR open in the circuit of valve V5 to remove thrusting force applied to the feed plate 34, (2) Its normally closed contacts LR2 open to deenergize valve V7 to have the detecting plate 36 retracted, and held retracted so long as the latch relay LR is latched, (3) Its normally closed contacts LR3 open to ensure that the valve V10 (which causes a return of the shuttle 5) is deenergized until after the latch relay LR is unlatched, (4) Its normally open contacts LR4 close to energize reset relay RR, which in turn opens its contacts RR1 in the upper left hand corner of the counting circuit of FIG. 4 to deenergize all counting relays CR1 through CR8 for resetting the same, and closes its contacts RR2 to energize valve V6 to retract the feed plate 34, (5) Its normally open contacts LR5 close, and these contacts plus closure of limit switch LS8 (which signifies retraction of detecting plate 36) set-up a circuit for the shuttle stroke valve V9.

Now, when the feed plate 34 returns to its retracted position it operates the limit switch LS5 into the position shown in FIG. 5, and this opens the circuit for the coil of hold relay HR, so that all contacts of relay HR return to their normal position. Also, limit switch LS5 now closes its upper contact to thereby complete the energizing circuit for the shuttle stroke valve V9, which has been previously partially completed by closure of limit switch LS8 and latch relay contact LR5. Thus, the hold relay HR held the platens 29, 31 down until the package feeding plate 34 was retracted, and for a period after the counting relays were reset.

Next, when the shuttle 5 reaches its far right hand position it actuates limit switch LS11 to closed position. This closure energizes the unlatching coil LR6 of the latch relay LR, to accomplish the following switching of the latch relay:

(1) Latch relay contacts LR1 reclose to permit energization of the feed plate thrust valve V5 in the succeeding cycle of machine operation for the next thrust of packages into a carton, (2) Latch relay contacts LR4 open deenergize reset relay RR, which relay need not no longer be energized since the feed plate 34 has been retracted, (3) Latch relay contacts LR2 reclose to have the valve V7 energized for moving the detection plate 46 into the next carton which has been brought into station C by the stroke of the shuttle 5, (4) Latch relay contacts LR5 open so that shuttle forward operation will not occur until the next closing of limit switch LS8 after relatching of the relay LR, and (5) Latch relay contacts LR3 close to energize valve V10 to return the shuttle 5 to its retracted position.

To complete the circuit manual switch 78 is provided, which when depressed will advance the shuttle through its stroke, so long as limit switches LS5 and LS8 are closed to signify retraction of plates 34 and 36 from the assembly line of the rails 3. Release of the manual switch 78 will cause a return of the shuttle 5 to its retracted position.

Figure 6:
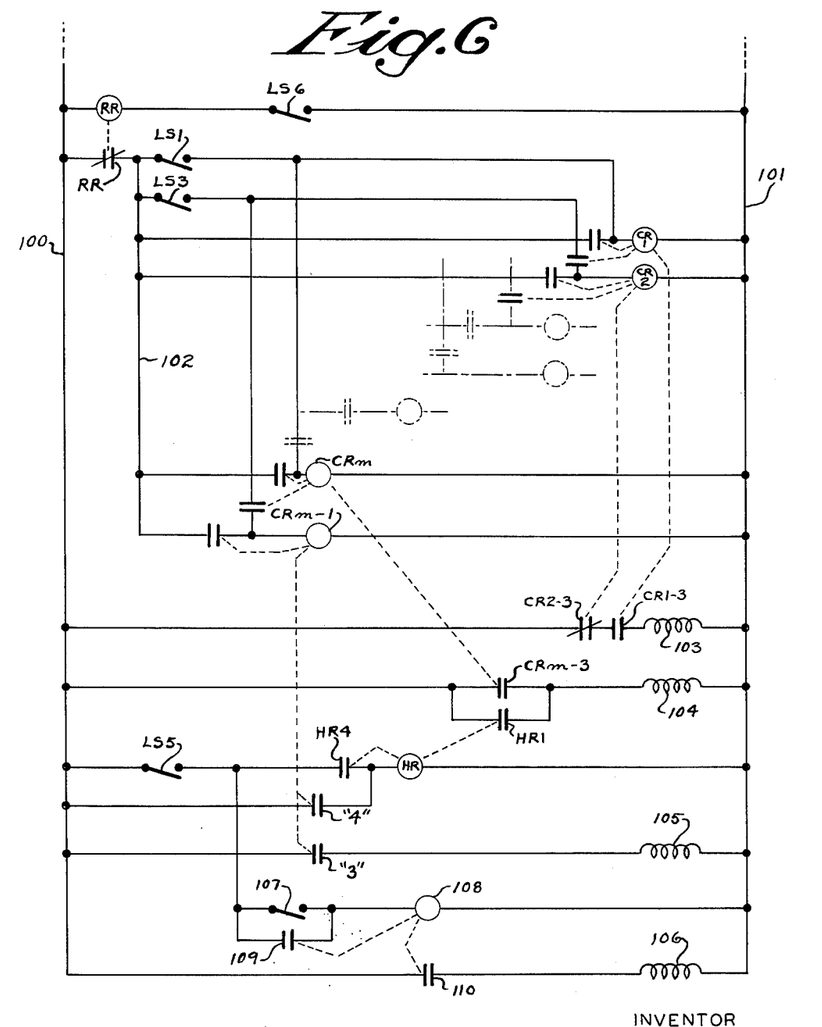
FIG. 6 is a schematic wiring diagram of another embodiment of the invention.

A basic representation of the circuit is shown in FIG. 6, without application being made to any specific machine. Elements similar to those in FIGS. 4 and 5 have like designations, so that a comparison of circuits can be made. Spaced voltage supply leads 100, 101 provide excitation for a number of circuits extending between the leads. At the top of the drawing is a reset relay RR energized upon closure of a limit switch LS6, which is closed at a certain point in the cycle of associated machine operation. Reset relay RR has normally closed contacts RR1 joining lead 100 with a supplementary voltage supply lead 102, which furnishes excitation for a counting circuit.

The counting circuit has a limit switch LS1, which closes to feed initial signal information to the counting relays, and a second limit switch LS3, which feeds further signal information to the relays. A first pair of counting relays comprises relays CR1 and CR2, and a final pair of counting relays comprises relays $CRn$ and $CRn+1$ (corresponding to relays CR7 and CR8 of FIG. 4). Any desired number of intermediary counting relays can be employed, as required by the functions to be performed by the counting and memory storage of the counting circuit. Relay CR1 has contacts CR1–3 which close to energize a winding 103, such winding functioning to control an operating element for a machine, and the relay CR2 has a set of normally closed contacts CR2–3 which open the circuit of the winding 103 and discontinue the associated machine function. The counting relay $CRn$ has a set of normally closed contacts $CRn$–3 that close to energize a further winding 104 of another electrical machine operating device, and the final counting relay $CRn+1$ has two sets of normally open contacts, that are mentioned here, designated "3" and "4." These contacts correspond to contacts CR8–3 and CR8–4 in FIG. 5.

Contacts "3" close to energize a winding 105 that controls performance of a machine function occurring subsequent to the counting function, and the contacts "4" close to energize a holding relay HR. Relay HR has self-holding contacts HR4 and maintenance contacts HR1 which will keep winding 104 energized after a resetting of the counting relays.

The closure of contacts "3" signals the energization of winding 105 to have the associated machine carry on its operation following the counting sequence, and during this subsequent operation a limit switch LS5 is closed, and will remain closed until the mechanical operations set in motion by the windings 105 and another winding 106 are both completed. Thus, holding relay HR can maintain an energized status through its contacts HR4 after the counting relays are reset and contacts "4" reopen.

Completion of the machine operation initiated by winding 105 causes closure of switch LS6 to energize reset relay RR and thereby open the counting relay circuits and reset them in a deenergized state. Also, at the completion of the machine operation effected by winding 105 a limit switch 107 is momentarily closed to energize a relay 108 having self-holding contacts 109 shunting the switch 107, and contacts 110 that close to energize the winding 106. When the machine operation associated with winding 106 is completed limit switch LS5 is reopened and relays HR and 108 are both deenergized. Winding 106 is likewise deenergized, and the circuit is ready for the next cycle of operation.

The abbreviated circuit of FIG. 6 illustrates the use of a holding relay energized by the last counting relay. Such holding relay may function, if desired, to hold the last operation of the counting sequence, and it also functions to remain energized after a resetting of the counting relays. The circuit also illustrates the use of the last counting relay to initiate the machine operation following the counting sequence.

Further, more complex circuit functions of the invention are illustrated in FIG. 5. For example, the holding relay can have contacts HR3 which must operate as a necessary signal before the machine operation subsequent to counting may occur. A third machine function can be added, the first being the counting, the second the package thrusting while the platens are held in a particular position, and the third being movement of the cartons. The latch relay is used as a third function relay, and it is operated only after limit, or test, switches indicate satisfactory performance of the second function, and while operated it precludes final shuttle retracting while at the same time having required operation before shuttle stroke could be commenced.

The invention provides a circuit that may be adapted to various machine operations, and the appended claims indicate the scope of the invention, rather than the preceding specific illustrative embodiments.

I claim:
1. In a control circuit the combination comprising:
   a plurality of counting relays divided into pairs,
      with the first relays of the pairs forming one chain of relays, and
      the second relays of the pairs forming a second chain of relays;
   first indicating switch means for operating the first relay of each pair of relays;
   second indicating switch means for operating the second relay of each pair of relays;
   each first relay of said pairs having contacts that establish an operating circuit between said second indicating switch means and the second relay of its pair; and
   each second relay of said pairs having contacts that establish an operating circuit between said first indicating switch means and the first relay of the next pair of relays.

2. A control circuit as in claim 1 in which each relay has self-holding contacts.

3. A control circuit as in claim 1 in which each first relay of said pairs of relays has an actuating contact adapted to operate a machine element, and in which each second relay of said pairs of relays has a contact adapted to cease operation of a machine element.

4. A control circuit as in claim 3 having a winding forming said machine element, the actuating contacts of said first relays are in series with one another and said winding, and the contacts of said second relays are each in parallel with an actuating contact.

5. In a control circuit the combination comprising:
   a first pair of counting relays,
      the first of the pair having
         first contacts for inclusion in the circuit of an electrical operating element for a machine,
         second contacts in connection with the coil of the second relay, and
         self-holding means for retaining an operated position,
      the second relay of the pair having
         first contacts for inclusion in the circuit of an electrical operating element of a machine,
         second contacts for connection with the coil of a first relay of a subsequent pair of counting relays, and
         self-holding means for retaining an operated position;
   a second pair of counting relays like said first pair with the coil of the first relay connected with said second contacts of the second relay of the first pair;
   subsequent similar pairs of counting relays with the second relay of the last pair having its second contacts for energizing a holding relay;
   a holding relay having
      an energizing circuit including said second contacts of the second relay of said last pair of counting relays, and
      a set of contacts in circuit with contacts of the first relay of the last pair of counting relays to effect a similar circuit function;

switch means for deenergizing said counting relays without deenergizing said holding relay; and further switch means that deenergize said holding relay subsequent to counting relay deenergization.

6. In a control circuit the combination comprising:
a set of counting relays divided into pairs with voltage lines adapted to energize such relays;
a first electrical machine operating device with an energizing circuit therefor including contacts of the first relay of the last pair of counting relays;
a hold relay with
  an energizing circuit therefor including contacts of the second relay of the last pair of counting relays, and
  having contacts in said energizing circuit of said first electrical operating device;
a second electrical machine operating device with an energizing circuit therefor including contacts of the second relay of the last pair of counting relays;
switch means operated upon completion of a machine operation responsive to said second electrical operating device which deenergizes said set of counting relays; and
further switch means in the energizing circuit of said holding relay adapted to be operated subsequent to said switch means to restore the holding relay.

7. In a control circuit the combination comprising:
a first electrical machine controlling device for operating a machine in a first sense of movement;
a second electrical machine controlling device for operating a machine in a second sense of movement;
a third electrical machine controlling device for operating a machine in a third sense of movement;
a set of counting relays for alternately energizing and deenergizing said first controlling device,
  the last of said counting relays having first contacts for partially establishing a circuit for said second controlling device and second contacts for energizing a hold relay;
a hold relay having
  an energizing circuit including said second contacts of said last counting relay,
  a first set of contacts for maintaining said first controlling device,
  a second set of contacts for partially establishing the circuit for said second controlling device,
  and a set of self-holding contacts;
test switch means in the circuit for said second controlling device which is responsive to and indicative of machine operation resulting from said first controlling device;
second test switch means responsive to and indicative of machine operation resulting from said second controlling device;
reset relay means responsive to said second test switch means that is in the energizing circuit of said counting relays and is adapted to reset the same; and
further test switch means responsive to a completion of machine operation occurring from said second controlling device that
  deenergizes said holding relay subsequent to operation of said reset relay means, and
  which partially establishes a circuit for said third controlling device.

8. In a control circuit the combination comprising:
a first electrical machine controlling device for operating a machine in a first sense of movement;
a second electrical machine controlling device for operating a machine in a second sense of movement;
a set of counting relays for alternately energizing and deenergizing said first controlling device,
  the last of said counting relays having contacts for energizing a hold relay;
a hold relay having
  an energizing circuit including said contacts of said last counting relay,
  a first set of contacts for maintaining said first controlling device, and
  a second set of contacts for partially establishing the circuit for said second controlling device;
test switch means in the circuit for said second controlling device which is responsive to and indicative of machine operation resulting from said first controlling device;
second test switch means responsive to and indicative of machine operation resulting from said second controlling device;
reset relay means responsive to said second test switch means that is in the energizing circuit of said counting relays and is adapted to reset the same; and
further test switch means responsive to a completion of machine operation occurring from said second controlling device that
  denergizes said holding relay subsequent to operation of said reset relay means.

9. In a control circuit the combination comprising:
a first electrical machine controlling device for operating a machine in a first sense of movement;
a second electrical machine controlling device for operating a machine in a second sense of movement;
relay means for energizing said first controlling device having
  first contacts for partially establishing a circuit for said second controlling device, and
  second contacts for energizing a hold relay;
a hold relay having
  an energizing circuit including said second contacts of said relay means,
  a first set of contacts for maintaiinng said first controlling device energized, and
  a second set of contacts for partially establishing the circuit for said second controlling device;
test switch means in the circuit for said second controlling device which is responsive to and indicative of machine operation resulting from said first controlling device;
second test switch means responsive to and indicative of machine operation resulting from said second controlling device;
reset relay means responsive to said second test switch means that is in the energizing circuit of said relay means and is adapted to reset the same; and
further test switch means responsive to a completion of machine operation occurring from said second controlling device that
  deenergizes said holding relay subsequent to operation of said reset relay means.

10. In a control circuit the combination comprising:
a first electrical control device for operating a machine in a first movement;
a second electrical control device for operating a machine in a second movement;
a third electrical control device for reversing the second movement;
a fourth electrical control device for operating a machine in a third movement;
a fifth electrical control device with an operating circuit therefor for reversing the third movement;
count relay means that has
  first contacts for operating a hold relay,
  second contacts which operate said first control device, and third contacts which partially establish a circuit for said second control device;
a hold relay having
  an operating circuit including said contacts of said count relay means to thereby be operated upon final operation of the count relay means,
  contacts that maintain operation of said first control device, and further contacts that partially establish the circuit for said second control device;
first test switch means responsive to said second movement of a machine;
a latch relay operated by said first test switch means having
> first contacts that open the circuit of said second control device,
> second contacts that close a circuit for said fourth control device,
> third contacts that open said circuit for said fifth control device, and
> fourth contacts that establish a circuit for a reset relay;
a reset relay operated by said fourth contacts of said latch relay, and having
> first contacts to deenergize said count relay means and
> second contacts to operate said third control device;
second test switch means operated by the second machine movement having
> first contacts for deenergizing said hold relay subsequent to reset relay operation and
> second contacts for operating said fourth control device; and
third test switch means operated by the third machine movement which is adapted to reset said latch relay and its contacts to thereby complete said circuit for said fifth control device.

11. In a control circuit the combination comprising:
a first electrical control device for operating a machine in a first movement;
a second electrical control device for operating a machine in a second movement;
a third electrical control device for operating a machine in a third movement;
relay means having
> first contacts to operate said first control device,
> second contacts which partially establish a circuit for said second control device,
> and third contacts which are for a hold relay operation;
a hold relay having
> an operating circuit including said third contacts of said relay means to thereby be operated upon an operation of the relay means,
> contacts that maintain operation of said first control device, and
> further contacts that partially establish the circuit for said second control device;
first test switch means responsive to said second movement of a machine;
a relay switch operated by said first test switch means having
> first contacts that open the circuit of said second control device, and
> second contacts that partially close a circuit for said third control device;
a reset relay responsive to said first test switch means having contacts to deenergize said relay means;
second test switch means operated by the second machine movement having
> first contacts for deenergizing said hold relay subsequent to reset relay operation,
> second contacts for operating said third control device; and
third test switch means operated by the third machine movement which is adapted to reset said relay switch.

12. In a control circuit for a packaging machine that has a first electrically operated device that stacks rows of packages one above the other, a second electrically operated device that transports a group of stacked packages into a carton, and a third electrically operated device that moves cartons to and from a package receiving station, the combination therewith of:
a first test switch that detects completion of a row of packages;
a set of counting relays for operating said first electrically operated device in response to said first test switch, said relays having self-holding means for remaining in operated condition to indicate a count of the rows of packages, and the last of said counting relays having
> first contacts for partially establishing a circuit for said second electrically operated device, and
> second contacts for energizing a hold relay;
a hold relay having
> a coil with a circuit including said second contacts of said last counting relay,
> a first set of contacts adapted to maintain operation of said first electrically operated device, and
> a second set of contacts for partially establishing the circuit for said second electrically operated device;
second test switch means, responsive to an operation of the first electrically operated device, with contacts in the circuit for said second electrically operated device;
third test switch means, responsive to and indicative of machine operation resulting from said second controlling device;
reset relay means responsive to said third test switch means and having contacts in the circuit of said counting relays which are operated to reset the counting relays to unoperated condition; and
fourth test switch means responsive to completion of a carton filling operation of said second electrically operated device, which fourth test switch means has contacts that
> deenergize said hold relay, and partially establish a circuit for said third electrically operated device.

13. In a control circuit for a packaging machine that has a first electrically operated device that stacks rows of packages one above the other and a second electrically operated device that moves stacked packages into cartons, the combination therewith of:
a first pair of counting relays,
> the first of the pair having
>> first contacts in a circuit for said first electrically operated device,
>> second contacts in connection with the coil of the second relay, and
>> self-holding means for retaining an operated position,
> the second relay of the pair having
>> first contacts in a circuit for said first electrically operated device,
>> second contacts for connection with the coil of a first relay of a subsequent pair of counting relays, and
>> self-holding means for retaining an operated position;
a second pair of counting relays like said first pair with the coil of the first relay connected with said second contacts of the second relay of the first pair;
subsequent similar parts of counting relays with the second relay of the last pair having its second contacts for energizing a holding relay, and further having contacts in a circuit for said second electrically operated device;
a holding relay having
> an energizing circuit including said second contacts of the second relay of said last pair of counting relays, and
> a set of contacts in a circuit for said first electrically operated device;

test switch means responsive to completion of operation of said first electrically operated device with contacts in a circuit for said second electrically operated device;

switch means for deenergizing said counting relays without deenergizing said holding relay; and further switch means that deenergize said holding relay subsequent to counting relay deenergization.

No references cited.

TRAVIS S. McGEHEE, *Primary Examiner.*